July 10, 1934.    J. E. PADGETT    1,966,310
SHOCK ABSORBING DEVICE
Filed Oct. 17, 1932
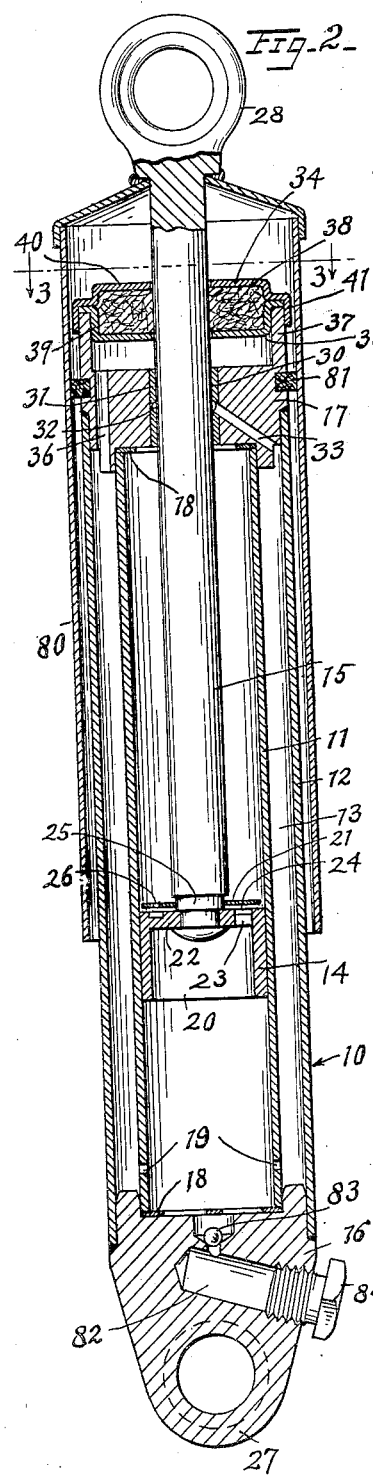
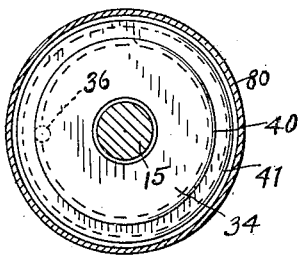
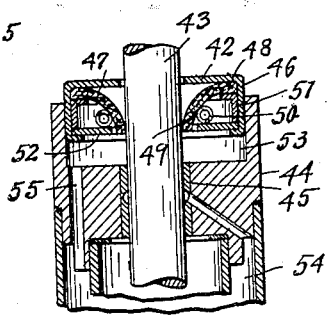
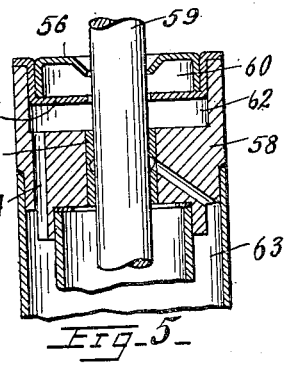
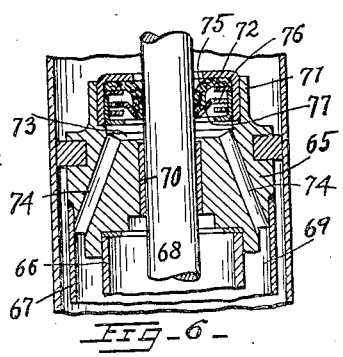
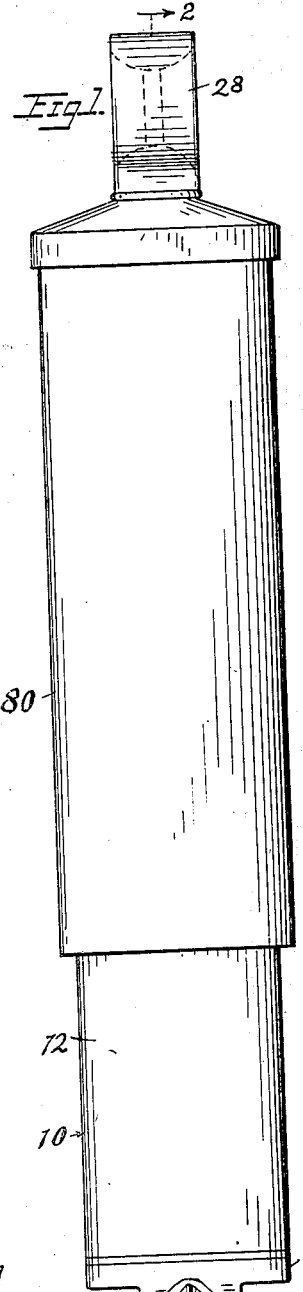
INVENTOR
JOSEPH E. PADGETT
Kwis Hudson + Kent
Attys.

Patented July 10, 1934

1,966,310

UNITED STATES PATENT OFFICE 1,966,310

SHOCK ABSORBING DEVICE

Joseph E. Padgett, Toledo, Ohio

Application October 17, 1932, Serial No. 638,059

10 Claims. (Cl. 188—88)

This invention relates to shock absorbing devices, and more particularly to an improved form of direct acting hydraulic shock absorber.

An object of this invention is to provide novel and efficient sealing means for a direct acting shock absorber, whereby the escape of fluid around the piston rod is effectively prevented.

Another object of this invention is to provide a shock absorber of the type referred to, having a working cylinder, a reservoir and a piston operable in the cylinder by a piston actuating rod extending through a bearing and a sealing means, and wherein fluid leakage past the sealing means is prevented by providing a space or chamber between the bearing and sealing means and which space is connected with the reservoir.

A further object of this invention is to provide a shock absorber of the type referred to, wherein the piston rod bearing is provided with a primary rod-sealing means, and wherein a secondary rod-sealing means is spaced outwardly from the bearing to provide therebetween a chamber which is connected with the reservoir.

The invention may be further briefly summarized as consisting in certain novel combinations and arrangements of parts, hereinafter described and particularly set out in the appended claims.

In the accompanying sheet of drawings,

Fig. 1 is an outside elevational view of a shock absorber constructed according to my invention.

Fig. 2 is a longitudinal sectional elevation thereof taken substantially on line 2—2 of Fig. 1.

Fig. 3 is a transverse sectional view taken on line 3—3 of Fig. 2.

Fig. 4 is a partial sectional view of another shock absorber constructed according to my invention, Fig. 5 is a partial sectional view of still another shock absorber constructed according to my invention, and Fig. 6 is a partial sectional view of yet another shock absorber constructed according to my invention.

Detailed reference will now be made to the accompanying drawing, illustrating an improved form of direct acting hydraulic shock absorber, wherein loss of fluid through leakage around the piston rod is substantially eliminated. Before proceeding with the detailed description, it should be understood, of course, that the invention may be embodied in other structures than those herein illustrated.

My improved shock absorber, as herein disclosed, is generally similar to the direct acting shock absorber disclosed in my co-pending application, Serial No. 575,267, filed November 16, 1931, but is an improvement over the device of said application. As shown in the drawing, this shock absorber is provided with a housing 10 having an inner sleeve 11 forming a working cylinder, and an outer sleeve 12 disposed around the inner sleeve to provide a fluid reservoir 13 therebetween. A piston 14 is reciprocably movable in the cylinder 11 for cooperation with a suitable fluid, such as an oil, for producing a shock absorbing action. A piston rod 15 extends into the cylinder and is operably connected to the piston for actuating the same.

Although the housing of the shock absorber may be of any suitable construction, in this instance I show the sleeves 11 and 12 assembled and retained in coaxial relation between the plug members 16 and 17, preferably by welding or otherwise suitably connecting the ends of the sleeve 12 to the respective plug members. Leakage of fluid around the ends of the sleeve 11 may be prevented by a press-fit between this sleeve and the plug members, or by the use of suitable gaskets 18 which are pressed against the ends of this sleeve by the plug members.

The reservoir 13 which, as stated above, is disposed around the working cylinder, is connected to the working cylinder by one or more restricted openings 19. These restricted openings are preferably located adjacent the plug member 16, as shown in Fig. 2, so as to be below the lower limit of travel of the piston 14, and to communicate with the reservoir at a point below the level of the liquid standing therein.

The piston 14 may be of any suitable construction, but is herein shown as comprising a cup-shaped metal member 20, and a valve disc 21 which is movable toward and away from the transverse wall 22 of the cup-shaped member forming the piston body. One or more openings 23 are formed through the transverse wall 22, and are connected on the upper side of this wall by a groove 24. The valve disc 21, which is movably mounted on the shouldered portion 25 of the piston rod, overlies the groove 24 and is provided with a flow-controlling orifice 26 which registers with the groove.

As shown in Fig. 2, the plug member 16 may be provided with a connecting portion, such as the eye 27, for attachment to an axle or other available portion of a vehicle structure. The outer end of the piston rod 15 is also provided with a suitable connecting portion or eye 28 which may be attached to another portion of the vehicle structure, such as the chassis frame.

Upon upward movement of the piston in the working cylinder the valve disc 21 is moved against the transverse wall 22 of the piston by the action of the fluid, and the compressive force to which the fluid is subjected between the piston and the plug member 17, causes the fluid to pass downwardly through the flow-controlling orifice 26, the size of the orifice being a determining factor in the shock absorbing action thus obtained. Upon downward movement of the piston in the working cylinder, some of the liquid is forced upwardly through the piston openings 23, and another portion of the liquid is forced out into the reservoir through the restricted openings 19. The liquid passing upwardly through the piston openings 23, unseats the valve disc 21, and flows around the edges of this disc into the upper portion of the cylinder. The extent of shock absorbing action obtained during the downward stroke of the piston may be determined by the area of the openings 23 and 19, and if desired, also by the annular opening between the outer edge of the disc 21 and the cylinder wall.

During the reciprocating movement of the piston, the portion of the piston rod extending into the working cylinder varies, as to length, and the volumetric capacity of the cylinder varies correspondingly. The liquid displaced by the piston rod entering the cylinder flows into the reservoir through the restricted openings 19, and by reason of the partial vacuum created upon the withdrawal of the piston rod from the cylinder, liquid returns to the working cylinder from the reservoir through the openings 19.

In direct acting hydraulic shock absorbers having a construction as thus far described, considerable difficulty has been experienced in preventing loss of liquid by leakage around the rod which actuates the piston. In some instances this leakage loss has been reduced, to some extent, by the use of a piston rod bearing embodying a packing, and a leakage collecting groove or recess which extends around the piston rod just inwardly of the packing and is connected with the upper end of the reservoir for returning liquid thereto. I find, however, that with this form of sealing means some of the oil escapes past the groove and, upon outward movement of the piston rod, collects or piles up at the inner end of the packing, thereby making it very difficult to obtain an effective seal, against the loss of liquid, particularly if the piston rod bearing has become somewhat worn. In the improved shock absorber of my invention, I avoid this piling up of oil at the inner end of the packing, by means presently to be explained, and have thereby produced a shock absorber wherein loss of liquid around the piston rod is substantially eliminated.

In addition to its function of forming a closure for the working cylinder and the reservoir 13, the plug member 17 provides a bearing for the piston rod 15. To this end the plug member is provided with an opening 30, through which the piston rod extends into the cylinder. It is usually desirable, although not altogether necessary, that a sleeve or bushing 31 be mounted in this opening around the piston rod. As a primary sealing means for preventing leakage of fluid between the piston rod and the bearing sleeve 31, I provide this sleeve with an annular groove or recess 32, which is connected with the upper end of the reservoir by means of the drainage passage 33. The groove 32 is formed in the inner surface of the sleeve 31, preferably at a point substantially midway between the ends of this sleeve. Upon upward movement of the piston in the working cylinder, the liquid between the piston and the plug member 17 is subjected to pressure, causing some of this liquid to travel outwardly between the piston rod and the bearing sleeve 31. The upward movement of the piston in the working cylinder also causes a partial vacuum to be created in the reservoir 13, with the result that the fluid leaking outwardly around the piston rod is collected in the recess 32 and readily returned to the reservoir through the passage 33.

To prevent such oil as may leak out through the sleeve 31, from piling up against the inner end of the piston rod packing and producing the undesirable result referred to above, I arrange the secondary sealing means 34 in spaced relation to the bearing sleeve 31, so as to provide a relatively large recess or chamber 35 therebetween. The piston rod extends outwardly through the packing or secondary sealing means 34, and the oil which escapes through the bearing sleeve 31 is scraped from the piston rod by this secondary sealing means and collects in the chamber 35. One or more passages 36 connect the chamber 35 with the upper end of the reservoir, so that liquid collecting in this chamber will be readily returned to the reservoir. The volume of the chamber 35 and the area of the passages 36 are preferably so proportioned that oil will not accumulate, or exert pressure against, the inner end of the piston rod packing which would result in leakage of some oil through the packing.

Although the collecting chamber 35 may be of any suitable shape or form, I find that this chamber can be conveniently formed by constructing the plug member 17 with an outwardly extending sleeve portion 37 in which the secondary sealing means 34 is mounted. Likewise, this secondary sealing means may be of any appropriate form, and in Fig. 2 I have shown this sealing means, preferably in the form of a self-contained unit or assembly, comprising a hollow metal shell and a body of packing material, such as cork, retained in this shell in scraping engagement with the piston rod. The metal shell may be conveniently formed by the use of a cupped metal member 39, adapted to be pressed into the sleeve portion 37 of the plug member 17, and an oppositely cupped metal member 40 having a flange 41 telescoping around the outer end of the sleeve portion 37.

Various other forms of sealing means may be employed in place of the secondary sealing means 34 shown in Fig. 2. For example, in Fig. 4 of the drawing, I have shown a secondary sealing means 42, which is disposed around a piston rod 43, and which is mounted in the outer end of a closure plug 44 in spaced relation to the outer end of the bearing sleeve 45. The secondary sealing means 42 is preferably constructed as a self-contained unit, comprising a metal shell 46, and a pliable washer 47 retained in the shell and scrapingly engaging the piston rod. This pliable washer may be of leather, or any other suitable material, and is preferably of frusto-conical shape, with the base 48 thereof anchored in the metal shell and the apex 49 thereof extending toward the bearing sleeve 45 and scrapingly pressed against the piston rod by means of the annular coiled spring 50. The base of the pliable washer may be conveniently anchored in the metal shell by means of the ring 51 and the disc 52, the latter also serving to retain the annular spring in the metal shell. In the operation of a shock absorber embodying this form of secondary sealing means, the oil escaping past the bearing sleeve 45 is scraped from the piston rod by the washer 47, and collects in the chamber 53, which is provided between the secondary sealing means and the bearing sleeve 45. The oil thus collected returns to the reservoir 54 through the passage 55.

In Fig. 5 of the drawing I have shown still another form of secondary sealing means which may be employed in place of the sealing means 34 shown in Fig. 2. This alternative form of sealing means comprises a pair of metal baffle plates 56 and 57, which are assembled, preferably as a unit, in the outer end of the plug member 58 so as to extend around the piston rod 59. Although these baffle plates may be of any convenient shape or form, it is important that they be arranged with an air space or separating chamber 60 therebetween, which chamber permits air to flow in or out around the piston rod, but prevents the escape of oil with the air flowing outwardly along the rod by separating the oil from the air. The sealing means formed by the baffle plates 56 and 57 is spaced outwardly from the bearing sleeve 61 of the plug member to provide a leakage collecting chamber 62 therebetween. Oil escaping from the bearing sleeve 61 is collected in this chamber, together with oil draining back from the separating chamber 60, and such collected oil is returned to the reservoir 63 through the passage 64.

Although it is usually desirable to provide the bearing for the piston actuating rod with a leakage collecting groove or recess 32, as shown in Fig. 2, I find that such groove may be omitted when the piston rod packing is spaced outwardly from the bearing so as to provide therebetween a chamber, such as the chamber 35 of Fig. 2, which is connected to the reservoir. To illustrate this alternative arrangement, I have shown, in Fig. 6, a plug member 65 for closing the sleeves 66 and 67 at their outer end. The sleeve 66 forms a working cylinder in which a piston is actuated by the piston rod 68 extending through the plug member. The sleeve 67 is spaced from the sleeve 66 to form a reservoir 69 between the sleeves.

The plug member 65 forms a bearing for the piston rod 68, and is preferably fitted with a bushing sleeve 70. The plug member is preferably provided at the outer end thereof with a sleeve portion 71 in which a packing unit 72 is mounted. According to my invention, the unit 72 is spaced outwardly from the bushing 70 to provide a chamber 73 therebetween which is connected with the upper end of the reservoir by the passages 74. The unit 72 may be of any desired form, but is here shown as comprising a metal shell, which is pressed into the sleeve 71, and a cone-like washer 75 of leather or other suitable material, having the apex thereof extending toward the chamber 73. This washer may be retained in the metal shell by any suitable means such as an arrangement of metal rings or washers including a washer 76 having a cone-shaped portion 77 for retaining the apex of the leather washer in scraping engagement with the piston rod.

If desired a tubular shield 80 may be mounted on the piston rod, as shown in Fig. 2, so as to telescope around the housing 10 and prevent foreign material from coming in contact with the piston rod and the sealing means through which the piston rod extends. A suitable packing washer 81 may be mounted on the plug member 17 for scraping engagement with the inner surface of the shield.

Likewise, if desired, the plug member 16 may be provided with a suitable filling opening 82, through which the device may be initially charged with oil, and through which the supply of oil in the device may be replenished or renewed from time to time. A check valve 83 may be provided in the filling opening to facilitate the operation of charging the device with liquid, and, if desired, a screw plug 84 may be employed for sealing the filling opening against leakage.

When the filling of the shock absorber through the passage 82 is accomplished as a bench operation, the device may be inverted from the position shown in Fig. 2 of the drawing, so that air can escape from the device through the filling opening as the liquid is being introduced. When the supply of liquid in the device is replenished or renewed without the device being removed from the vehicle, the liquid is forced in through the filling opening 82 and the air contained in the device is compressed in the upper end of the reservoir, and during the subsequent operation of the device the air gradually escapes through the passage 36 and past the piston rod packing 38. While the air is in the compressed state in the upper end of the reservoir, its presence is beneficial rather than harmful in that it aids the return flow of liquid to the working cylinder through the openings 19 during the up stroke of the piston and provides a cushioning effect during the down stroke of the piston.

From the foregoing description and accompanying drawing it should now be readily understood that I have provided an improved form of shock absorber, wherein leakage of liquid around the piston actuating rod is effectively prevented. It will be understood, moreover, that in my improved construction the protection against loss of liquid continues throughout the useful life of the device and even after considerable wear has taken place between the piston rod and the piston rod bearing. From the foregoing description it will also be readily seen that this effective sealing action is attained largely by the use of a collecting chamber just inwardly of the packing, which readily permits the escaping liquid to be returned to the reservoir, and prevents such liquid from piling up or exerting a pressure against the inner end of the packing.

While I have illustrated and described the device of my invention in a detailed manner, it should be understood, however, that I do not wish to be limited to the precise details of construction and arrangement of parts illustrated and described, but regard my invention as including such changes and modifications as do not involve a departure from the spirit of the invention and the scope of the appended claims.

Having thus described my invention, I claim:

1. In a shock absorber the combination of a housing having a working cylinder and a reservoir therein, a piston in said cylinder, a rod extending into said cylinder for actuating said piston, and means providing said housing with a plurality of fluid collecting recesses through which said rod extends, said recesses being spaced apart in the direction of the axis of said rod and being in communication with said reservoir for returning fluid leakage thereto.

2. In a shock absorber the combination of a housing having a working cylinder and a liquid reservoir therein, a piston in said cylinder, a rod extending into said cylinder and operably connected to said piston, and closure means for said cylinder through which said rod extends, said closure means having a plurality of liquid collecting recesses in communication with said reservoir and spaced apart in the direction of the axis of said rod.

3. In a shock absorber the combination of a housing having a cylinder therein and a reservoir for supplying liquid to the cylinder, a piston in said cylinder, a rod extending into said cylinder for actuating said piston, means providing said housing with an opening for said rod and a recess communicating with said opening and with said reservoir, sealing means around said rod and spaced outwardly from the first mentioned means to provide a chamber therebetween, and means connecting said chamber with said reservoir.

4. In a shock absorber the combination of a housing having a cylinder therein and a reservoir having restricted communication with said cylinder, a piston in said cylinder, a rod extending into said cylinder for actuating said piston, means providing said housing with a bearing for said rod, said housing having a chamber therein disposed outwardly of said bearing and connected to said reservoir, and sealing means cooperating with said rod substantially at the outer end of said chamber.

5. In a shock absorber the combination of a housing having a cylinder therein and a reservoir communicating with said cylinder, a piston in said cylinder, a rod extending into said cylinder for actuating said piston, means providing said housing with a bearing for said rod, said bearing having a groove therein which is intermediate the edges of the bearing surface contacted by the rod and is connected with said reservoir, and sealing means for said rod spaced outwardly from said bearing to provide a chamber therebetween, said housing having a passage therein connecting said chamber with said reservoir.

6. In a device of the character described the combination of a housing having a cylinder therein and a reservoir communicating with said cylinder, a piston in the cylinder, said housing having a wall portion provided with an opening leading to said cylinder, a rod operably connected to said piston and slidable in said opening, a recess in the wall of said opening and extending around said rod, means connecting said recess with said reservoir to return fluid leakage to the latter, means sealingly cooperating with said rod and spaced outwardly of said wall portion to provide a fluid chamber therebetween, and means connecting said chamber with said reservoir.

7. In a device of the character described the combination of a housing having a cylinder therein, a member closing said cylinder at one end thereof, said member having a recess in its outer end and a passage leading from said recess to said cylinder, a piston in said cylinder, a rod slidable in said passage for actuating said piston, a recess in the wall of said passage intermediate the ends of the passage, a reservoir communicating with said cylinder, means connecting the second mentioned recess with said reservoir, sealing means disposed around said rod and forming a closure for the outer end of the first mentioned recess, and means connecting said reservoir with said first mentioned recess inwardly of said sealing means.

8. In a device of the character described the combination of a housing having a cylinder therein, a member closing said cylinder at one end thereof, said member having a recess in its outer end and a passage leading from said recess into said cylinder, a piston in said cylinder, a rod extending into the cylinder through said recess and said passage for actuating said piston, a sleeve disposed in said passage and engaging said rod, a leakage collecting chamber around said rod intermediate the ends of said sleeve, a reservoir communicating with said cylinder, means connecting said chamber with said reservoir, sealing means around said rod and closing said recess at the outer end thereof, and means connecting said reservoir with said recess.

9. In a shock absorber the combination of a housing having a cylinder therein and a reservoir communicating with the cylinder, a piston in said cylinder, a rod slidable in a portion of said housing for actuating said piston, primary rod-sealing means on said portion including a recess extending around the rod and connected to said reservoir, and secondary rod-sealing means disposed outwardly of said primary sealing means, said housing having a recess therein just inwardly of said secondary sealing means and a passage connecting said recess with said reservoir.

10. In a shock absorber the combination of a working cylinder having fluid therein, a reservoir restrictedly connected with the cylinder, a piston in said cylinder for cooperation with said fluid, a piston rod extending into the cylinder for actuating said piston, means providing a bearing for said rod and forming a closure for the cylinder, and a piston rod packing spaced outwardly from said bearing, the space between the packing and bearing being connected with the reservoir for returning thereto the fluid which is scraped from the rod by the packing.

JOSEPH E. PADGETT.